Figures 1, 2:
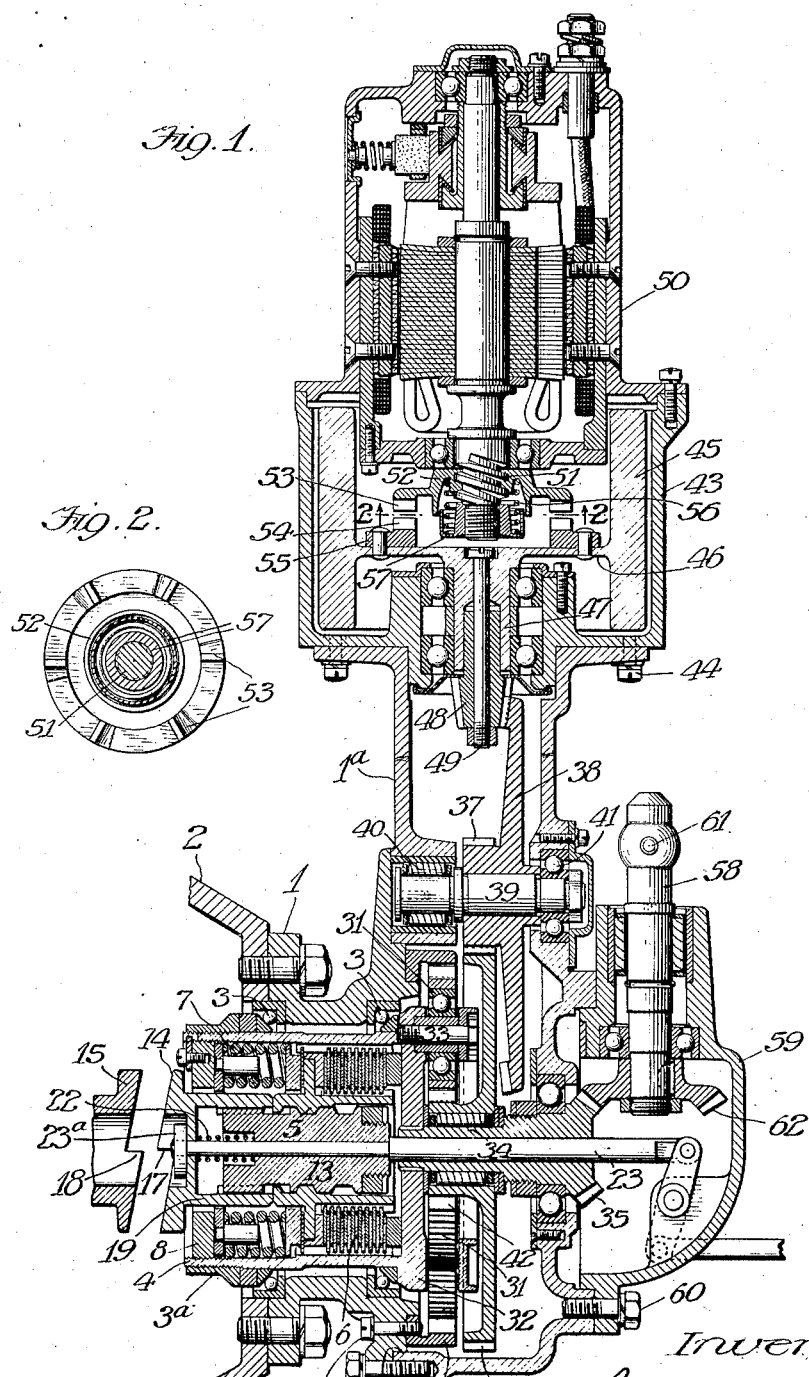

April 16, 1929.   R. P. LANSING   1,709,027
ENGINE STARTER
Filed Sept. 23, 1926

Witness
Martin H. Olsen.

Inventor
Raymond P. Lansing
By Rector, Hibben, Davis & Macauley
His Attys.

Patented Apr. 16, 1929.

1,709,027

UNITED STATES PATENT OFFICE.

RAYMOND P. LANSING, OF MONTCLAIR, NEW JERSEY, ASSIGNOR TO ECLIPSE MACHINE COMPANY, OF ELMIRA, NEW YORK, A CORPORATION OF NEW YORK.

ENGINE STARTER.

Application filed September 23, 1926. Serial No. 137,373.

My invention relates to engine starting apparatus for the starting of engines, such as internal combustion engines, and more particularly but not necessarily air-plane engines, and the object thereof is to provide a simple, efficient and reliable apparatus capable of either manual or power operation, or both, and characterized by the provision of novel and efficient cooperating casings for the enclosing and supporting of the various parts in their different assemblies and providing also accuracy in the joint assembly of the individual units or assemblies and accuracy and rigidity in respect to the bearings for the main parts or shafts of the moving parts. My apparatus is further characterized by the provision of novel automatic engaging and disengaging means between the power means such as an electric motor and the reduction gearing which cooperates with the drive or transmission portion of the apparatus.

My apparatus comprises a transmision or drive proper having a driving member or element adapted to engage a member of the engine to be started and power means and prime mover such as an electric motor and manually operated means. The power means and the manual means may be combined in the same apparatus and may be used separately or conjointly, if desired, and moreover, either one or the other of these two power means may be dispensed with in respect to a complete apparatus, whereupon such apparatus will be operated either wholly by power means or wholly by manual means.

In the drawings, Figure 1 is an elevation of an apparatus embodying my invention but with the manual means turned at a right angle so as to illustrate the same in the same section; and Fig. 2 a section on the line 2—2 of Fig. 1 to illustrate the cooperatig teeth in the engaging and disengaging means.

First describing the drive proper, here taking form as a barrel and the parts receiving torque through the barrel, the same is located within a main casing 1 which is suitably supported as by being detachably connected with the crankcase 2 of the engine, a small portion of which is illustrated. This casing has a wide central longitudinal opening provided with anti-friction bearings 3—3 within which rotates a driving barrel 4. A nut 5 is concentrically arranged within the barrel and at such distance therefrom as to provide a considerable annular space to receive a yieldable driving connection which is here in the form of a friction clutch 6. This clutch is composed of two sets of disks which are splined respectively to the interior of the barrel and the exterior of the nut. The proper pressure for the disks is provided by a series of springs 7 located in such annular space, and such pressure is regulated by the adjustable nut 8 screwing into the outer end of the barrel.

The bearings 3 are here ball bearings and the assembly and retention of the drive proper within the casing 1 is permitted by the provision of an adjustable nut $3^a$ screwing upon the exterior of the driving barrel.

The nut 5 is provided with internal long lead threads in which is threaded a screw shaft 13 which constitutes the main or body portion of the driving member whose other principal portion is a clutch member 14 which is adapted to engage a member of the engine to be started, such as the corresponding clutch element or engine member 15 forming a part of or secured to a rotatable part of the engine to be started. The clutch members 14 and 15 are provided respectively with complementary cooperating inclined clutch jaws 17 and 18, and member 14 has a shell portion 19 which is splined upon the outer end of the screw shaft 13.

A manually operated rod 23 extends centrally through the screw shaft 13 and the clutch member 14, and is provided at its outer end with a head $23^a$ in the form of a nut screwing thereon. As a result, the clutch member 14 is drivingly connected with the screw shaft 13 for rotation thereby, and also has a limited longitudinal movement with respect thereto against the tension of a coil spring 22 arranged within and between said parts.

Next referring to the reduction means, the same constitutes of gearing which is contained within a second casing $1^a$ having the novel structure and cooperating relationship with respect to casing 1 as hereinafter explained. The reduction gearing is supported entirely within this casing $1^a$ and in the same it has its bearings. Moreover, the construction of the two assemblies of drive proper and the reduction gearing are such that one is readily applied to and received by the other to establish their driving relationships when the entire apparatus is being assembled in complete form.

The casing 1 and 1ª are secured together by the screws 1ᵇ and the pilot joint 1ᶜ in order to preserve proper alignment therebetween, particularly in view of the fact that the axis of the screw shaft 13 is in exact alignment with the central axis of the reduction gearing.

A stationary internal gear 29 is secured by screws 30 to the casing 1 and with the same there meshes a series of three planetary pinions 31 which are journaled upon a plate 32 which constitutes the end plate of the barrel 4 and which in the present instance is integral therewith. These pinions are mounted upon studs 33 which are secured to and project laterally from such plate 32. This plate 32 has a central opening which drivingly receives as by splining the left-hand end (Fig. 1) of a central shaft 34 which is provided at its outer end with a bevel gear 35, here shown as integral therewith. This shaft 34 has a central opening through which the manually operated rod 23 passes.

Upon the shaft 34, there is loosely mounted a large gear 36 which meshes with a pinion 37 here formed as the part of a hub of a large bevel gear 38 that I may term the main rotary gear. This latter gear is secured intermediate the length of a shaft 39 which has its bearings in the opposite side walls of the casing 1ª through the medium of the anti-friction bearings 40 and 41.

It is extremely important that these two bearings be in exact alignment, and it is one of the purposes of the peculiar construction of this casing 1ª with its two opposite and parallel side walls that provision is thereby made whereby accuracy in the alignment of these two bearings is obtained. The planetary gears 31 mesh both with the internal gear 29 and with a central pinion 42 which is here formed as a part of the hub of the gear 36.

Describing the inertia means, the same comprises a flywheel and operating connections with the bevel gear 38 and with the prime mover which is an electric motor. The inertia means are contained within and supported by a casing 43 which is removably secured to the casing 1ª in suitable manner as by the screws 44. The flywheel comprises a rim 45 having a predetermined or desired mass or weight, a web 46 and a hub 47. This hub is drivingly secured to the vertically disposed hub of a bevel gear 48 and such parts are held together in suitable manner as by means of a bolt 49. This pinion 48 meshes with the bevel gear 38.

The electric motor 50 is provided with an extended armature shaft having a screw threaded portion 51 on which is threaded a nut 52 having a flange provided on its under surface with clutch teeth 53 and adapted to engage with cooperating clutch teeth 54, rising from the web of the flywheel and preferably formed on the upper surface of a ring 55 secured to such web. The normal position of these jaws is one of separation, as shown in Fig. 1 and the same is maintained particularly as against any downward creeping of the nut by means of the light spring 56 interposed between such nut and a spring retainer 57 at the lower end of the armature shaft.

The clutch teeth 53 and 54 are made of the particular form and relationship, as shown in Fig. 2 in order to provide excessive backlash between them to thereby insure entrance of the teeth in the endwise or longitudinal movement of the nut with respect to the ring 55 and its teeth. To this end, wide spaces are made between the teeth 53 of the nut 52 and the same are beveled at one side, as shown in Fig. 2, which gives wide entrance space for the clutch teeth 54 and practically eliminates the chance of abutting of the teeth end to end.

Next describing the manual means, the same comprises a cranking shaft 58 which is journaled in a casing 59 suitably and removably connected with the casing 1ª as by means of screws 60. This cranking shaft is provided at a point exterior of the casing 59 with suitable pins 61 to receive an ordinary hand crank and at its inner end with a bevel pinion 62 which meshes with the pinion 35.

Describing a cycle of operation of the apparatus and starting first with the utilization of the power means or electric motor as the source of energy and with the parts in their normal position, as shown in Fig. 1, in which the clutch elements 14 and 15 and also the clutch elements 53 and 54 are disengaged, when the motor is energized the armature shaft will be rotated and as an incident thereto the nut 52 will be automatically advanced so as to bring the clutch teeth 53 and 54 into driving relation, whereby the rotation of the armature will be transmitted to the flywheel, and consequently to the bevel pinion 48. The torque will thereupon be transmitted through the reduction gearing by means of the gears and pinions hereinbefore explained and thence to the plate 32 of the driving barrel 4 and through the clutch 6 to the nut 5 and screw shaft 13. The rotation of the drive proper is comparatively slow owing to the reduction gearing and the screw shaft remains in its normal or retracted position. When the desired R. P. M. of the flywheel is reached, the operator shifts the rod 23 to the left by means of suitable operating connections not shown (extending through the casing 59) whereupon the clutch member 14 of the screw shaft will be brought into engagement with the clutch member 15 of the engine. The engine will now be cranked and when the same operates on its own power, the clutch members 14 and 15 will be automatically disengaged owing to the inclination of the clutch jaws 17 and 18.

Next describing the operation with the utilization of the manual means as the source of energy, a hand crank is applied to the cranking shaft 58 and rotated by the operator first slowly until the flywheel gathers speed and thereupon more rapidly until the desired or predetermined R. P. M. of the flywheel is reached. In this operation, the torque is transmitted from the cranking shaft 58 through pinions 62 and 35, shaft 34, plate 32 and reduction gearing to the flywheel 45 which, of course, at this time is disengaged from the electric motor. The flywheel having now been rotated to the proper speed, the rod 23 is operated as before and the engine cranked and the drive subsequently disengaged automatically in the same maner as above explained.

I claim:

1. An engine starter comprising two casings connected together, a rotatable drive proper having its bearings positioned by one of said casings, reduction gearing for rotating said drive located in the other one of said casings and including a main rotary gear, starting means for operating said gearing including an electric motor for operating said gear, said second mentioned casing having opposite integral walls in which said gear has its bearings.

2. An engine starter comprising two casings connected together, a drive proper having a bearing positioned by one of said casings and reduction gearing for rotating said drive located in the other one of said casings and including a gear coaxial with said drive and having a bearing in said other casing, and starting means for operating said gearing including an electric motor for operating said gear, said casings having interengaged parts axially separable and laterally contacting forming piloting means for centering them with their respective bearings coaxial.

3. An engine starter comprising two casings connected together, a drive proper located in one of said casings and reduction gearing for rotating said drive located in the other one of said casings and including a rotary gear having its bearings positioned by its said casing, starting means for operating said gearing including an electric motor for operating said gear, said drive including an assembly comprising in concentric arrangement a barrel and shell operatively connected together for rotation, a part for engagement with a member of the engine to the driven and a driving shaft for said part arranged within and operatively connected with the shell, and anti-friction bearings arranged between said barrel and its casing.

4. An engine starter comprising two casings detachably connected together in axially separable relation and having coacting laterally contacting parts for centering them, a drive proper located in one of said casings and having its bearings therein, reduction gearing located in the other one of said casings and including a main rotary gear, starting means for operating said gearing including an electric motor for operating said gear, said second mentioned casing having integral walls affording two aligned bearings for said gear.

5. An engine starter including a drive having a driving member adapted to engage and crank a member of the engine to be started, an electric motor having an armature shaft and an automatic driving connection between such shaft and the drive including a screw driving member threaded on the shaft, and a driven member operatively connected with the drive, said last two members having engaging teeth formed to provide excessive backlash between them.

6. An engine starter including a drive having a driving member adapted to engage and crank a member of the engine to be started, an electric motor having an automatic driving connection between said shaft and the drive including a screw driving member operatively associated with said shaft and a driven member operatively connected with the drive, said last two members having teeth for interengagement, said teeth being widely spaced apart to provide extensive backlash between them.

In testimony whereof, I have subscribed my name.

RAYMOND P. LANSING.